United States Patent
Andry et al.

(10) Patent No.: US 9,876,200 B2
(45) Date of Patent: Jan. 23, 2018

(54) ALL-SILICON HERMETIC PACKAGE AND PROCESSING FOR NARROW, LOW-PROFILE MICROBATTERIES

(71) Applicant: International Business Machines Corporation, Armonk, NY (US)

(72) Inventors: Paul S. Andry, Yorktown Heights, NY (US); Bucknell C. Webb, Yorktown Heights, NY (US); Cornelia T. Yang, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 15/040,706

(22) Filed: Feb. 10, 2016

(65) Prior Publication Data

US 2017/0040580 A1    Feb. 9, 2017

Related U.S. Application Data

(60) Provisional application No. 62/202,558, filed on Aug. 7, 2015.

(51) Int. Cl.
| | |
|---|---|
| *H01M 2/08* | (2006.01) |
| *H01M 2/02* | (2006.01) |
| *H01M 6/40* | (2006.01) |
| *H01M 10/04* | (2006.01) |

(52) U.S. Cl.
CPC ............ *H01M 2/08* (2013.01); *H01M 2/026* (2013.01); *H01M 2/0207* (2013.01); *H01M 6/40* (2013.01);
(Continued)

(58) Field of Classification Search
CPC ...... H01M 2/08; H01M 10/0436; H01M 6/40; H01M 2/0207; H01M 2/026; H01M 2220/30
See application file for complete search history.

(56) References Cited

U.S. PATENT DOCUMENTS

| 5,432,027 A | 7/1995 | Tuttle et al. |
| 6,432,577 B1 | 8/2002 | Shul et al. |
| (Continued) | | |

FOREIGN PATENT DOCUMENTS

WO    2014182535 A1    11/2014

OTHER PUBLICATIONS

International Search Report dated Oct. 20, 2016, received in a corresponding foreign application.
(Continued)

*Primary Examiner* — Stewart A Fraser
(74) *Attorney, Agent, or Firm* — Scully, Scott, Murphy & Presser, P.C.; Louis J. Percello, Esq.

(57) ABSTRACT

A microbattery structure for hermetically sealed microbatteries is provided. In one embodiment, the microbattery structure includes a first silicon substrate containing at least one pedestal which houses a cathode material of a microbattery and at least one depression which houses A FIRST sealant material of the microbattery. The structure further includes a second silicon substrate containing at least one pedestal which houses an anode material of the microbattery and at least one depression which houses a second sealant material of the microbattery. An insulated centerpiece is bonded to the first sealant material present in at least two depressions on the first silicon substrate. An interlock structure is formed by aligning and superimposing the second silicon substrate on the first silicon substrate in a mortise and tenon fashion and sealing the two substrates using a high force.

15 Claims, 7 Drawing Sheets

(52) U.S. Cl.
CPC .... *H01M 10/0436* (2013.01); *H01M 2220/30* (2013.01)

(56) References Cited

U.S. PATENT DOCUMENTS

| | | |
|---|---|---|
| 6,482,543 B1 | 11/2002 | Shelekhin et al. |
| 6,764,525 B1 | 7/2004 | Whitacre et al. |
| 7,932,700 B2 | 4/2011 | Cintra et al. |
| 8,191,756 B2 | 6/2012 | Coppeta et al. |
| 8,283,750 B2 | 10/2012 | Guiraud et al. |
| 2007/0224081 A1 | 9/2007 | Bokerman et al. |
| 2010/0272393 A1 | 10/2010 | Kathman et al. |
| 2011/0189528 A1 | 8/2011 | Wu et al. |
| 2012/0241216 A1 | 9/2012 | Coppeta et al. |
| 2013/0095381 A1* | 4/2013 | Oukassi .............. H01M 4/5805 429/209 |
| 2014/0199597 A1 | 7/2014 | Ni et al. |

OTHER PUBLICATIONS

Hahn et al. "Silicon integrated micro batteries based on deep reactive ion etching and through silicon via technologies" Electronic Components and Technology Conference (ECTC), May 29, 2012-Jun. 1, 2012, IEEE 62nd, pp. 1571-1577.

Cheng et al., "Localized silicon fusion and eutectic bonding for MEMS fabrication and packaging", Journal of Microelectromechanical Systems, Mar. 2000, pp. 3-8, vol. 9, No. 1.

Sparks et al., "Wafer-to-wafer bonding of nonplanarized MEMS surfaces using solder", Journal of Micromechanics and Microengineering, Sep. 2001, pp. 630-634, 11.6.

* cited by examiner

ALL-SILICON HERMETIC PACKAGE AND PROCESSING FOR NARROW, LOW-PROFILE MICROBATTERIES

BACKGROUND

The present invention relates to battery technology, and more particularly to a microbattery structure for providing hermetically sealed microbatteries.

There exists a range of emerging applications (e.g., biomedical, IoT, remote sensing) where very small, low-profile power sources, on the order of 100 µAh capacity or less, are required. While functional batteries of this size are relatively simple to fabricate, the requirements of small physical dimension and low profile (far less than any existing metal coin cell battery on the market today) make it quite difficult to fully and hermetically seal such batteries. Typically, metal cans or coin cells are of cylindrical symmetry and employ a crimped seal between the outer metal and a polymer gasket, but such crimped seals are extremely difficult or impossible to make if the entire cell is 1 mm or less in width, 0.2 mm thick and of an arbitrary shape, e.g., rectangular or arc-shaped.

Typical flexible battery structures, which do not use metal cans, but rather flexible polymer enclosures, are often the size of a postage stamp, and require very large sealing zones at their edges, on the order of several millimeters wide. If these polymer/adhesive seals were much narrower, the seal lifetime would be considerably impacted. In such systems, it would be highly impractical to attempt to create a seal width of much less than 1 mm. As such, a serious sealing problem arises when trying to fabricate very small, thin, narrow batteries of 1 mm total width or less.

Existing commercial solutions are either metal can type packages of cylindrical symmetry with crimped seals, or flexible polymer packages with very wide seal widths of several millimeters. Certain long-life lithium ion batteries employ glass-to-metal seals to ensure full hermeticity since Li cannot be exposed to any moisture. However, given the constraints of the very small physical dimensions given above, and the desire for a non-Li battery chemistry such as the $MnO_2$—Zn system with an alkaline or acidic electrolyte, very few packaging options exist for creating a quality seal of 100 µm width or less.

U.S. Pat. No. 6,432,577 B1 to Shul et al. discloses a method and apparatus to fabricate a microbattery that uses silicon as a structural component, packaging component and semiconductor. The method disclosed by Shul et al. uses four silicon wafers to form a planar microbattery structure in which two silicon wafers serve as structural frames and two silicon wafers serve as an anode and a cathode, respectively. The external silicon frames are of 425 µm thickness each. Shul et al. use an epoxy sealant material to bond the two external silicon frames together. This technique employs an O-ring to bond the two silicon wafers together with epoxy material to form a hermetic seal. Use of O-ring increases the seal width substantially.

SUMMARY

The present invention uses a combination of advanced 3D silicon processing techniques including photolithography, deep silicon reactive ion etching (D-RIE), temporary wafer bonding/thinning/debonding, etc., to create precision-etched lock and key battery packaging structures out of silicon. These will serve to fully and reliably encase a microbattery and provide for the possibility of very thin and narrow cells, having seal widths on the order of approximately 100 µm or less and whose total thickness is no greater than 400 µm.

In one aspect of the present invention, microbattery structures for forming hermetically sealed microbatteries are provided. In one embodiment of the present invention, the microbattery system includes a first silicon substrate containing at least one pedestal which defines an area that houses a cathode material and at least one depression which defines an area that houses a first sealant material. The microbattery system further includes a second silicon substrate containing at least one pedestal which defines an area that houses an anode material and at least one depression which defines an area that houses a second sealant material. The microbattery system also includes an insulated centerpiece bonded to the first sealant material present in at least two depressions on the first silicon substrate, wherein an interlock structure is formed by aligning and superimposing the second silicon substrate on the first silicon substrate in a mortise and tenon fashion.

In another embodiment of the present invention, the microbattery system includes a first silicon substrate containing at least one pedestal which defines an area that houses a first sealant material and at least one depression which defines an area that houses a cathode material. The microbattery system further includes a second silicon substrate containing at least one pedestal which defines an area that houses an anode material and at least one depression which defines an area that houses a second sealant material, wherein an interlock structure is formed by aligning and superimposing the second silicon substrate on the first silicon substrate in a mortise and tenon fashion.

In yet another embodiment of the present invention, the microbattery system includes a first silicon substrate containing at least one depression which houses a sealant material and an anode material, and a second silicon substrate containing at least one pedestal which houses a cathode material and at least one depression, wherein an interlock structure is formed by aligning and superimposing said second silicon substrate on first silicon substrate in a mortise and tenon fashion.

DETAILED DESCRIPTION

Figure 1:
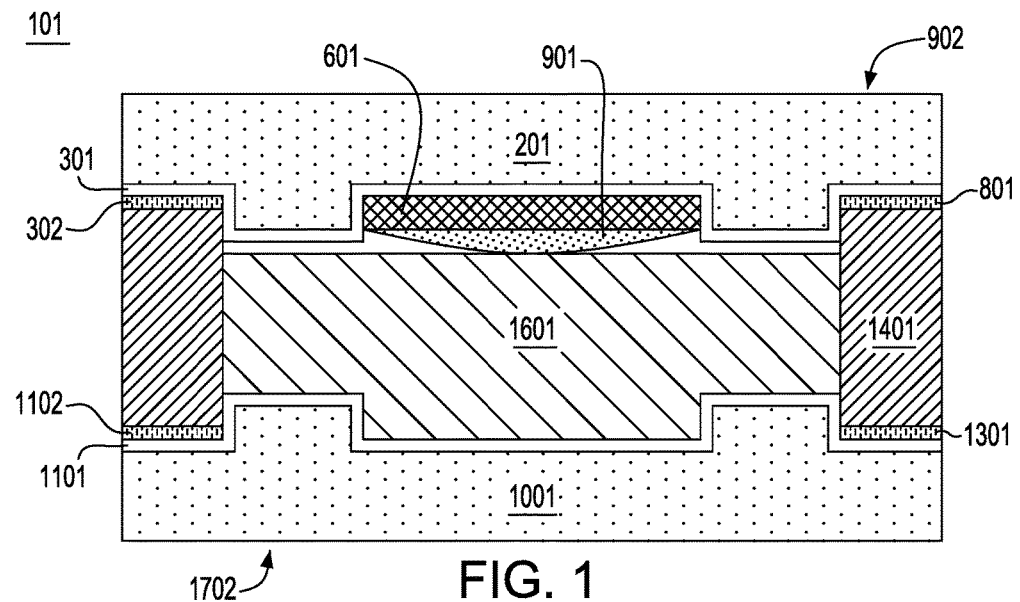
FIG. 1 is a schematic sectional illustration of an interlock structure of a microbattery comprising a shallow cathode, a shallow anode insert and an insulated centerpiece bonded to both the anode and the cathode sides in accordance with one embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed present invention, as oriented in the drawing figures. The terms "overlying", "underlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term "pedestal" means raised structures created on a silicon substrate by etching. The term "mortise and tenon structure" means a first element, i.e., a depression etched on first silicon substrate, that interlocks with a second element, i.e., a pedestal etched on second silicon substrate, whose dimensions are complementary to each other. The term 'aspect ratio' means the ratio of width to thickness of adhesive material.

In an embodiment of the present invention, a microbattery comprising an anode side and a cathode side, both made of silicon, is presented. In an embodiment, the microbattery is fabricated using well-known processes, in two halves, an insert side and a bottom side, and thereafter the two halves are joined together. Each side is individually fabricated after which the insert side is aligned with, and superimposed over the bottom side, and joined with the bottom side with high force, i.e., pressure as defined herein below.

The present invention will now be described in detail with reference to the figures, in accordance with an embodiment of the present invention.

FIG. 1 depicts a microbattery structure 101 in which a cathode side 1702 is aligned and superimposed on anode side 902 and bonded with high force to form an interlock structure. In an embodiment, the anode side 902 and the cathode side 1702 of the microbattery are fabricated in parallel. In an embodiment, anode side 902 is the insert piece and the cathode side 1702 is the bottom piece.

In an embodiment, an insulated centerpiece 1401 is bonded to the cathode side before the anode side 902 is aligned and superimposed over the cathode side 1702. Sealant material 1301 and 801 is applied on both the cathode side 1702 and the anode side 902, respectively, in one embodiment of the present invention. The various other components (or elements) of the microbattery structure 101 shown in FIG. 1 will be described in greater detail hereinbelow in reference to FIGS. 2-17.

In an embodiment, the thickness of microbattery is no greater than about 400 μm. In an embodiment, the seal width of the microbattery is no greater than 100 μm.

Figure 2:
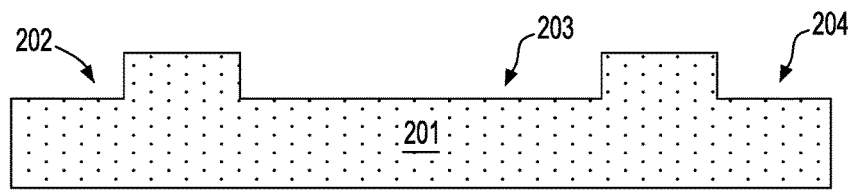
FIG. 2 is a schematic sectional illustration showing cavities etched in silicon to accommodate the anode material and a sealant material during fabrication of the anode side of a microbattery in accordance with an embodiment of the present invention.

FIGS. 2-9 depict the anode side 902 of the microbattery structure 101 of FIG. 1, at different steps of the fabrication process, in accordance with an embodiment of the present invention. Notably, FIG. 2 shows cavities (i.e., depressions) 202, 203 and 204 etched into an insert silicon substrate 201. In an embodiment, a deep silicon reactive ion etch is used to etch the insert silicon substrate 201. During this step of the present invention, pedestals are formed in the insert silicon substrate 201 as shown in FIG. 2.

Figure 3:
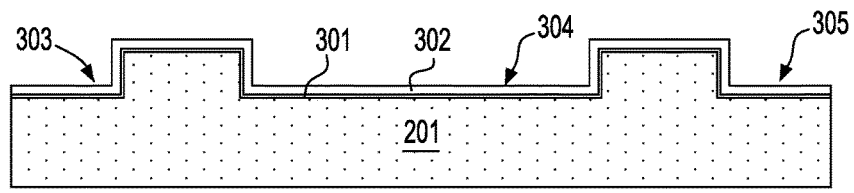
FIG. 3 is a schematic sectional illustration showing a layer of a seed metal deposited over an adhesion metal layer in the cavities shown in FIG. 2 during fabrication of the anode side of the microbattery in accordance with an embodiment of the present invention.

FIG. 3 shows a next step in which an adhesion metal layer 301 and a layer of seed metal 302 are deposited as a layer over cavities 202, 203 and 204 creating layered cavities 303, 304 and 305 over a surface of insert silicon substrate 201. In an embodiment, adhesion metal layer 301 is titanium tungsten (TiW), however those skilled in the art understand that titanium (Ti) or tantalum (Ta) or other suitable materials can be used in place of TiW. In an embodiment, adhesion metal layer 301 serves as a metal barrier to prevent electrolyte egress from the anode of the microbattery. In an embodiment, seed metal 302 is copper (Cu), however those skilled in the art understand that seed metal 302 may be another appropriate material such as, for example, gold (Au). Seed metal 302 serves as an anode current collector. In an embodiment, adhesion metal layer 301 serves as an electrical contact to the microbattery. In an embodiment, adhesion metal layer 301 has discontinuities to electrically isolate a mechanical seal bonded to adhesion metal layer 301 from a battery electrical circuit.

Figure 4:
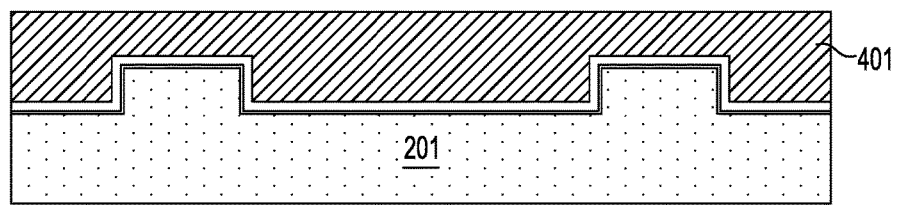
FIG. 4 is a schematic sectional illustration showing a layer of photoresist deposited over the seed metal in the cavities shown in FIG. 3 during fabrication of the anode side of the microbattery in accordance with an embodiment of the present invention.

FIG. 4 shows a next step in a fabrication of the anode in which a layer of photoresist 401 is deposited over seed metal 302, completely filling layered cavities 303, 304, 305 with photoresist material.

Figure 5:
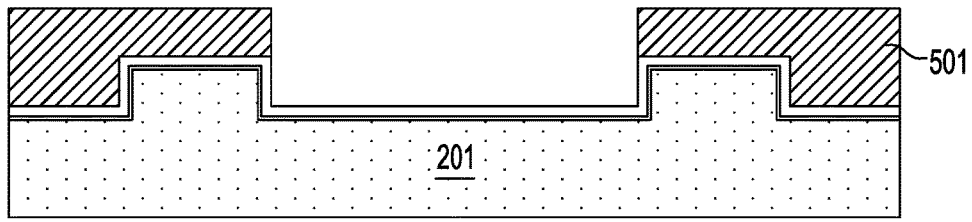
FIG. 5 is a schematic sectional illustration showing a polymer bondable sealant material applied and etched, exposing the seed metal, the anode current collector, shown in FIG. 4 during fabrication of the anode side of a microbattery in accordance with an embodiment of the present invention.

FIG. 5 shows a next step in a fabrication of the anode in which photoresist 501 is photopatterned into a shape exposing a surface of seed metal 302 which is the anode current collector.

Figure 6:
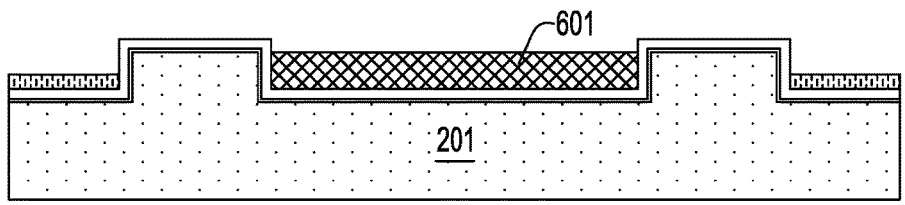
FIG. 6 is a schematic sectional illustration showing a seed metal electroplated on one of the cavities shown in FIG. 5 with a homogeneous solid composed of indium, bismuth, and zinc to form the anode, during fabrication of the anode side of a microbattery in accordance with an embodiment of the present invention.

FIG. 6 shows a next step in a fabrication of the anode in which the exposed surface of seed metal 302 is electroplated with a homogeneous solid composed of indium, bismuth, and zinc (In/Bi/Zn) to form anode material 601. In an embodiment, anode material 601 is a homogeneous solid metallic alloy composed of 100 ppm to 1000 ppm Bi, 100 ppm to 1000 ppm In, and the remainder is Zn, however those skilled in the art understand that the anode material 601 can be composed of another material, such as zinc metal. In an embodiment, anode material 601 is 1 μm to 50 μm thick, however those skilled in the art understand that anode material 601 can be another appropriate thickness. The remainder of photoresist 401 is removed after the anode material 601 is electroplated on the exposed surface of seed metal 302. In the embodiment illustrated in the drawings, the anode material 601 is formed in a region defined by a pair of silicon pedestals of the insert silicon substrate 201.

Figure 7:
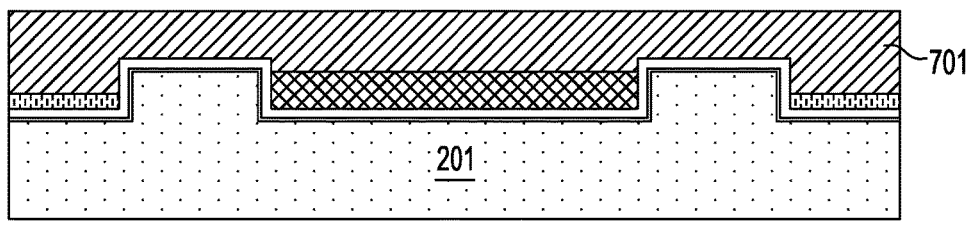
FIG. 7 is a schematic sectional illustration showing a layer of photoresist deposited over the seed metal and the anode shown in FIG. 6 during fabrication of the anode side of a microbattery in accordance with an embodiment of the present invention.

FIG. 7 shows a next step in a fabrication of the anode in which a layer of photoresist 701 is deposited over seed metal 302 and anode material 601 protecting anode material 601. A patterning of photoresist 701 defines wiring traces and a pattern of seed metal 302 and adhesion metal layer 301. In a subtractive etching process, unmasked areas of seed metal 302 and adhesion metal layer 301 are removed.

Figure 8:
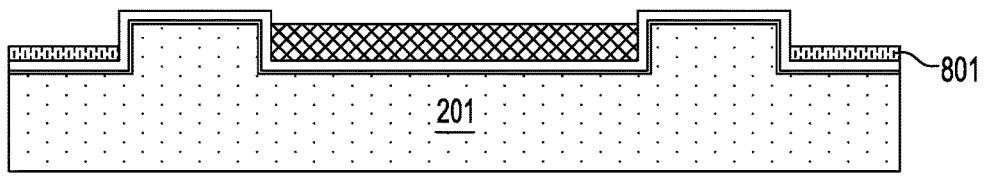
FIG. 8 is a schematic sectional illustration showing a layer of polymer bondable sealant material applied and patterned, exposing the surface of the anode shown in FIG. 7 during fabrication of the anode side of a microbattery in accordance with an embodiment of the present invention.

FIG. 8 shows a next step in a fabrication of the anode in which photoresist 701 is completely stripped and a polymer bondable sealant material 801 is applied on cavities 303 and 305 and patterned, exposing a surface of anode material 601. Polymer bondable sealant material 801 that is left after exposing a surface of an anode material 601 is permanent and is not stripped.

One of the major reasons for leaks in batteries is due to pressure built inside batteries as a result of hydrogen gas accumulation inside the battery with prolonged use of battery. The excess pressure built up inside the battery ruptures the seal in the ends of the battery thereby leading to leakage of battery substances. In this present invention, and to circumvent leakage, a seal with a width no greater than 100 μm is employed. Also, the aspect ratio of the seal is greater than 10:1, so the distance that moisture or gas has to travel in through the seal from the exterior is large when compared to the cross section of a pathway (the sealant material itself) it has to travel through. In the present invention, a polymeric sealant material with selective permeability which allows the passage of hydrogen molecules only is employed.

Figure 9:
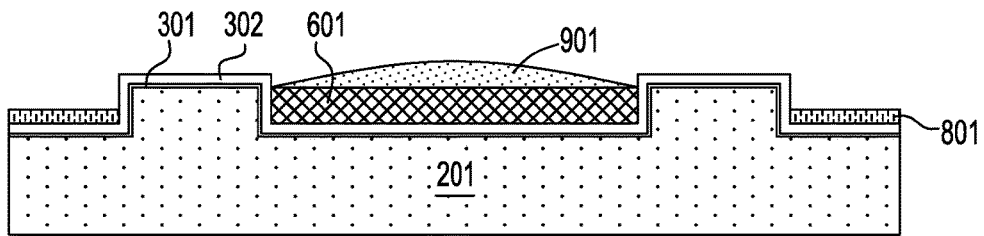
FIG. 9 is a schematic sectional illustration showing an electrolyte-infused separator material deposited into the cavity comprising the anode material in FIG. 8 to create the anode during fabrication of the anode side of a microbattery in accordance with an embodiment of the present invention.

FIG. 9 shows a next step in a fabrication of the anode in which an electrolyte-infused separator material 901 is deposited on the exposed surface of anode material 601 thereby forming anode side 902 of the microbattery. In an embodiment, the electrolyte used in providing the electrolyte-infused separator material 901 is one or more of: ammonium chloride, an aqueous salt solution such as KOH, zinc chloride, or zinc acetate with an additive such as ZnO. In an embodiment, the separator material used in providing the electrolyte-infused separator material 901 comprises one or more of a flexible porous material, a gel, a sheet that is from 10 μm to 100 μm in thickness that is composed of cellulose, cellophane, polyvinyl acetate (PVA), PVA/cellulous blends, polyethylene (PE), polypropylene (PP), or a mixture of PE and PP. In an embodiment, the electrolyte present in the electrolyte-infused separator material 901 is deposited by dispensing electrolyte material manually. In an embodiment, the electrolyte present in the electrolyte-infused separator material 901 is deposited by using an ink jet method. In the present invention, the separator material of the electrolyte-infused separator material 901 is positioned between the anode material and the cathode material.

Having described embodiments of an anode (which are intended to be illustrative and not limiting), it is noted that modifications and variations may be made by persons skilled in the art in light of the above teachings. It is therefore to be understood that changes may be made in the particular embodiments disclosed which are within the scope of the present invention as outlined by the appended claims.

Figure 10:
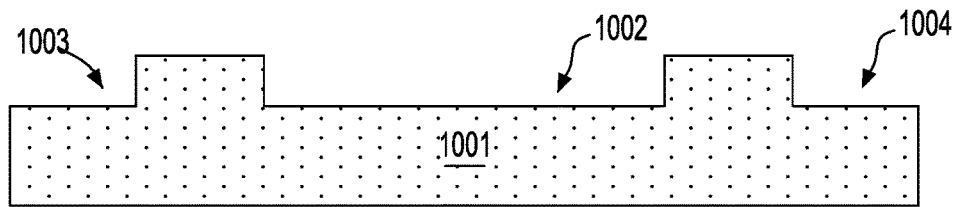
FIG. 10 is a schematic sectional illustration showing cavities that are etched to accommodate a cathode material during fabrication of the cathode side of a microbattery in accordance with an embodiment of the present invention.

FIGS. 10-17 depict a cathode side 1702 of the microbattery structure 101, at different steps during a fabrication process, in accordance with an embodiment of the present invention. FIG. 10 shows cavities 1002, 1003, 1004 etched into a bottom silicon substrate 1001 in the first step. Textures are added to cavity 1003 by patterning arbitrary shapes on cavity 1003 using D-RIE. The added texture increases available area for the cathode material and holds the cathode material in place.

Figure 11:
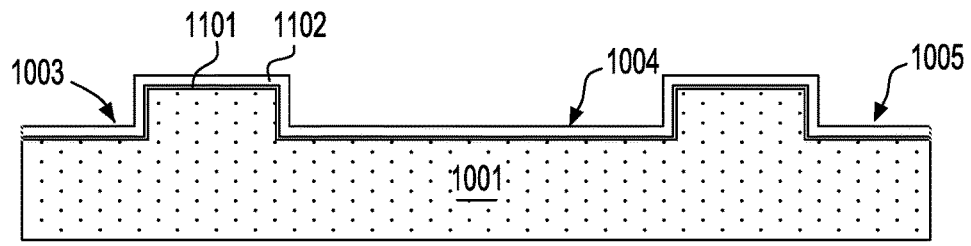
FIG. 11 is a schematic sectional illustration showing a layer of a current collector metal over an adhesion metal layer in the cavities shown in FIG. 10 during fabrication of the cathode side of the microbattery in accordance with an embodiment of the present invention.

FIG. 11 shows a next step in which an adhesion metal layer 1101 and a suitable current collector metal 1102 are deposited as a layer in cavity 1002, 1003, 1004 creating layered cavity 1103, 1104, 1105 and over a surface of bottom silicon wafer substrate 1001. In an embodiment, adhesion metal layer 1101 is titanium (Ti), however those skilled in the art understand that titanium tungsten (TiW) or tantalum (Ta) or other suitable materials can be used in place of Ti. In an embodiment, adhesion metal layer 1101 serves as a metal barrier to prevent electrolyte egress from the cathode of the battery. In an embodiment, adhesion metal layer 1101 serves as an electrical contact to the battery. In an embodiment, adhesion metal layer 1101 has discontinuities to electrically isolate a mechanical seal bonded to adhesion metal layer 1101 from a battery electrical circuit.

In an embodiment, the suitable current collector metal 1102, which serves as the cathode current collector, is indium tin oxide (no), however those skilled in the art understand that other transparent conducting oxides can be used, such as indium zinc oxide (IZO), Al-doped zinc oxide (AZO), or Ga-doped zinc oxide (GZO). In an embodiment, a combination of ITO, IZO, AZO, and GZO can be used as the current collector metal 1102. In an embodiment, the current collector metal 1102 can be replaced with nickel (Ni), and carbon-coated Ni. In an embodiment, the current collector metal 1102 can be thin, with a thickness of between 20 nm and 200 µm, which provides for a mechanically flexible battery and consumes less space than a material requiring a thicker layer for the cathode current collector.

Figure 12:
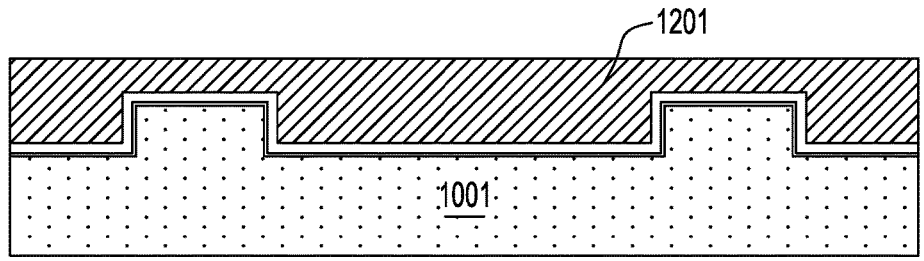
FIG. 12 is a schematic sectional illustration showing a layer of photoresist deposited over the layered cavities shown in FIG. 11 according to an embodiment of the present invention.

FIG. 12 shows a next step in a fabrication of the cathode in which a layer of photoresist 1201 is deposited over transparent conducting oxide 1102, completely filling layered cavity 1103, 1104, 1105 with a photoresist material. A patterning of photoresist 1201 defines wiring traces. In a subtractive etching process, unmasked areas of seed metal 1102 and adhesion metal layer 1101 are removed.

Figure 13:
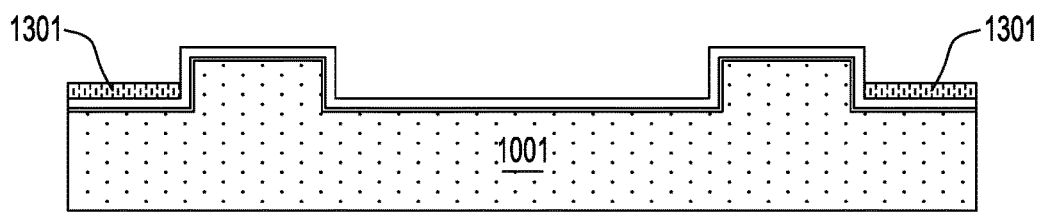
FIG. 13 is a schematic sectional illustration showing a layer of polymer bondable sealant material applied and patterned, exposing the surface of the layered cavity shown in FIG. 12 during a fabrication of the cathode side of a microbattery in accordance with an embodiment of the present invention.

FIG. 13 shows a next step in which sealant material 1301 is applied to layered cavities 1103, 1104 and 1105. In an embodiment, sealant material 1301 is a polymeric seal with selective permeability. In an embodiment, sealant material 1301 allows only passage of hydrogen molecules through the seal.

Figure 14:
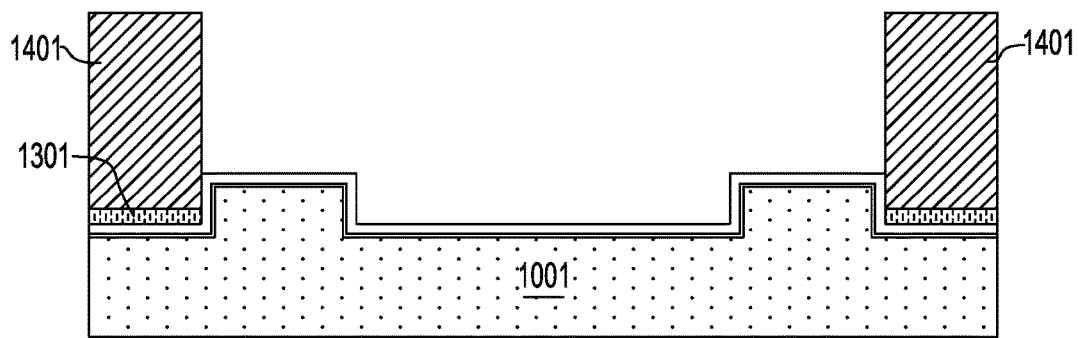
FIG. 14 is a schematic sectional illustration showing a centerpiece bonded to the bottom silicon wafer shown in FIG. 13 in accordance with an embodiment of the present invention.

FIG. 14 shows centerpiece 1401 bonded to sealant material 1301. In an embodiment, centerpiece 1401 is made of insulator material or out of silicon coated with an insulator such as, for example, PECVD oxide or nitride. In an embodiment, the width of centerpiece 1401 is less than 50 µm and the length of centerpiece 1401 is less than 150 µm.

Figure 15:
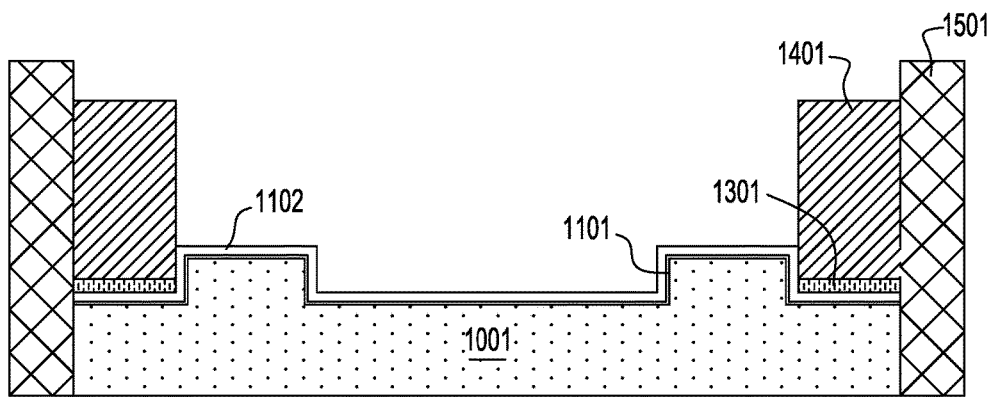
FIG. 15 is a schematic sectional illustration showing a precision stencil applied over the transparent conducting oxide in the cavity shown in FIG. 14 during fabrication of the cathode side of the microbattery in accordance with an embodiment of the present invention.

FIG. 15 shows a next step in a fabrication of the cathode in which a precision stencil 1501 is applied over the layered cavity 1103, 1104 and 1105 and centerpiece 1401. The precision stencil 1501 is created to prevent cathode paste from fouling the field area or the sealing ring. In one embodiment, precision stencil 1501 is silicon.

Figure 16:
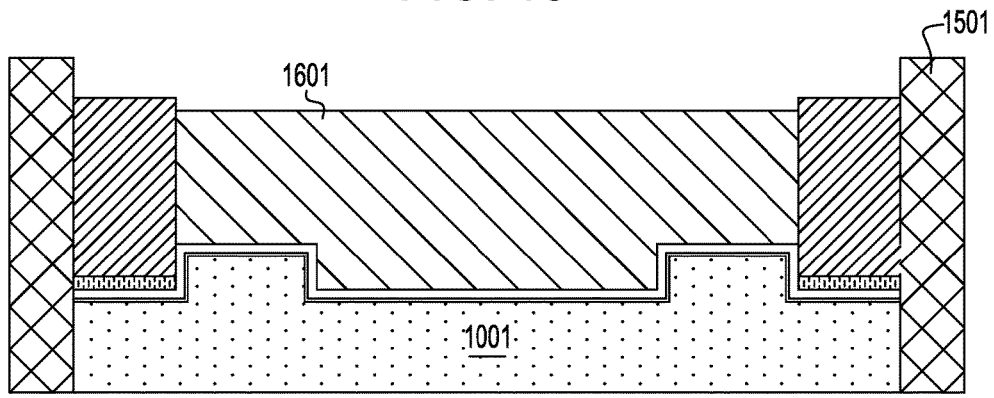
FIG. 16 is a schematic sectional illustration showing a cathode material inserted over the transparent conducting oxide shown in FIG. 15 during fabrication of the cathode side of the microbattery in accordance with an embodiment of the present invention.

FIG. 16 shows a step in a fabrication of the cathode side 1702 of the microbattery in which cathode material 1601 is inserted into cavity 1104. In the embodiment illustrated, the cathode material 1601 is formed into an area located between a pair of silicon pedestals formed into bottom silicon substrate 1001. In an embodiment, cathode material 1601 is manganese dioxide ($MnO_2$), however those skilled in the art understand that other suitable materials can be used. Cathode material 1601 can be electroplated nickel hydroxide (NiOOH) or a mixture of $MnO_2$ with or without a binder. Because transparent conducting oxide 1102 is thin, less space is consumed by transparent conducting oxide 1102, leaving more space for cathode material 1601, enabling a construction of a battery that contains more energy relative to a microbattery of a same size that uses a thicker material for a cathode current collector. In an embodiment, cathode material 1601 is in direct contact with transparent conducting oxide 1102, a current collector.

Figure 17:
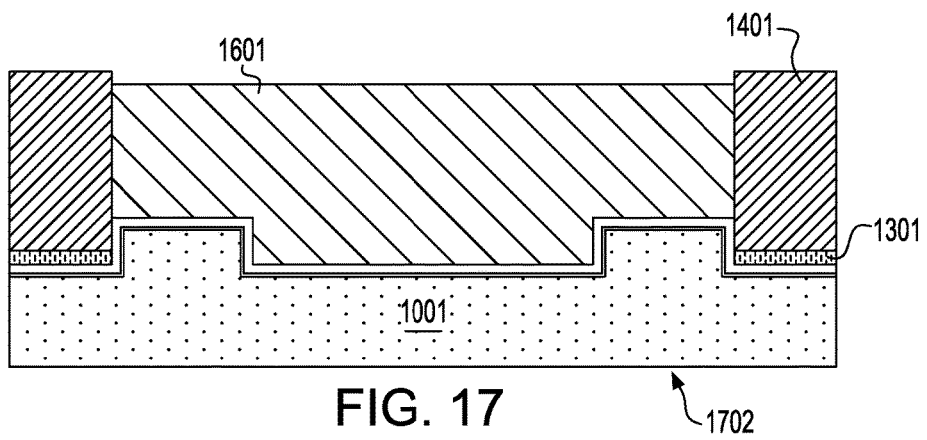
FIG. 17 is a schematic sectional illustration showing the cathode side of the microbattery after removal of the stencil material in accordance with an embodiment of the present invention.

FIG. 17 shows a next step in the fabrication process in which the precision stencil 1501 is washed off to form cathode side 1702 of the microbattery.

Having described embodiments of a cathode (which are intended to be illustrative and not limiting), it is noted that modifications and variations may be made by persons skilled in the art in light of the above teachings. It is therefore to be understood that changes may be made in the particular embodiments disclosed which are within the scope of the present invention as outlined by the appended claims.

Figure 18:
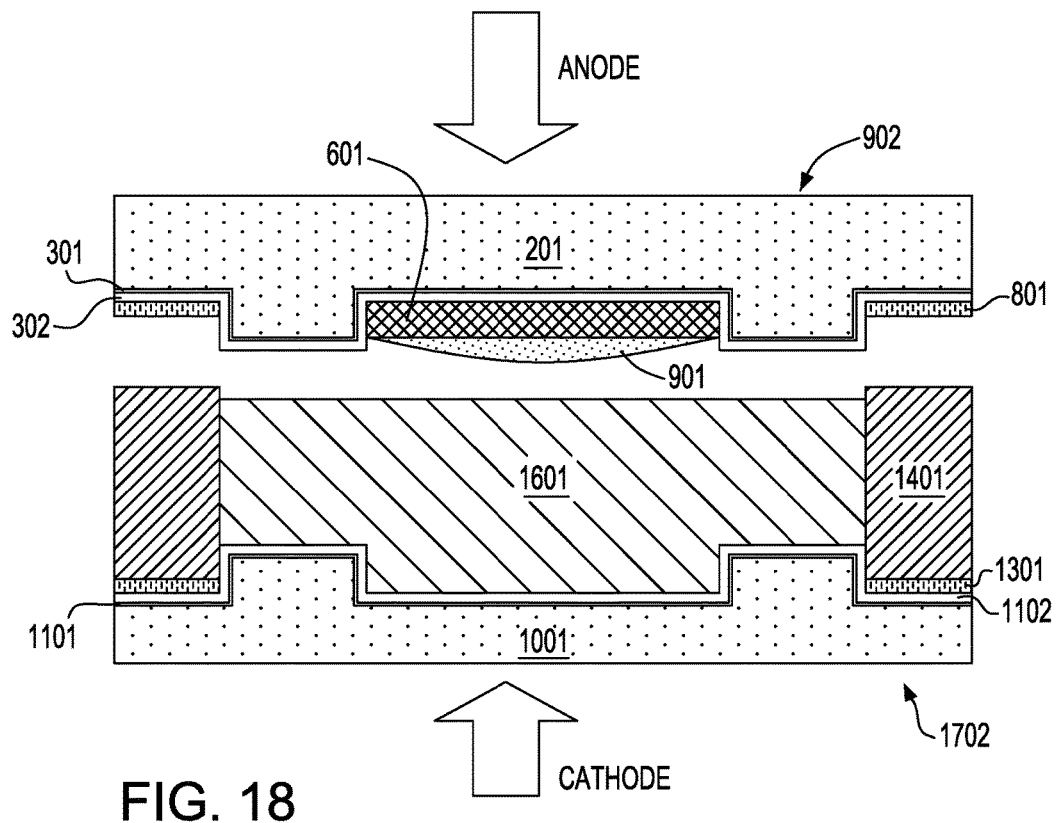
FIG. 18 is a schematic sectional illustration showing the orientation in which the anode side and the cathode side are bonded together during fabrication of the microbattery shown in FIG. 1 in accordance with an embodiment of the present invention.

FIG. 18 depicts the orientation in which anode side 902 and cathode side 1702 are joined together to form the microbattery structure shown in FIG. 1. Notably, an interlock structure is formed by aligning and superimposing the second silicon substrate mentioned above on the first silicon substrate mentioned above in a mortise and tenon fashion. Sealing of the two substrates is then achieved by using high pressure. By "high pressure" it is meant that the pressure applied is in the range of 0.1 MPa to 10 MPa for a seal area per side of on the order of 100 $mm^2$.

Figure 19:
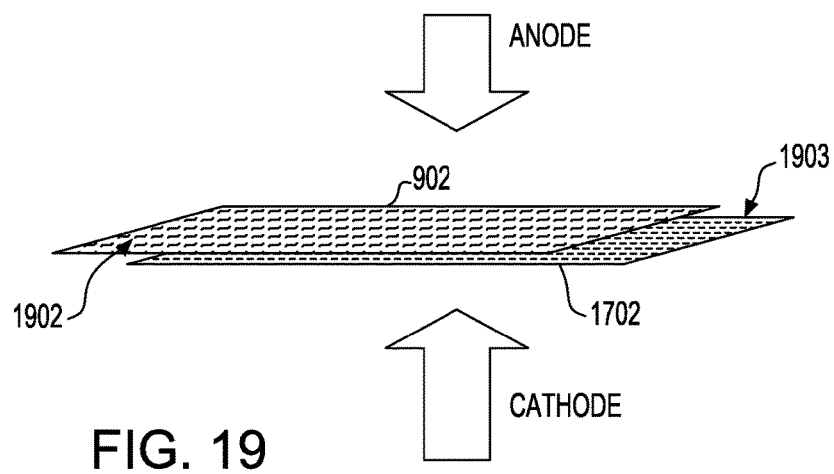
FIG. 19 is a top-down view showing a structure of a microbattery in which current collectors on the anode side and the cathode side of the microbattery extend outside the microbattery interlock structure thereby escaping the packing of the microbattery in accordance with an embodiment of the present invention.

FIG. 19 depicts a microbattery in which current collectors (1902, 1702) on the anode side 902 and the cathode side 1702 extend outside the microbattery interlock structure thereby escaping the packing of the microbattery in accordance with an embodiment of the present invention.

Figure 20:
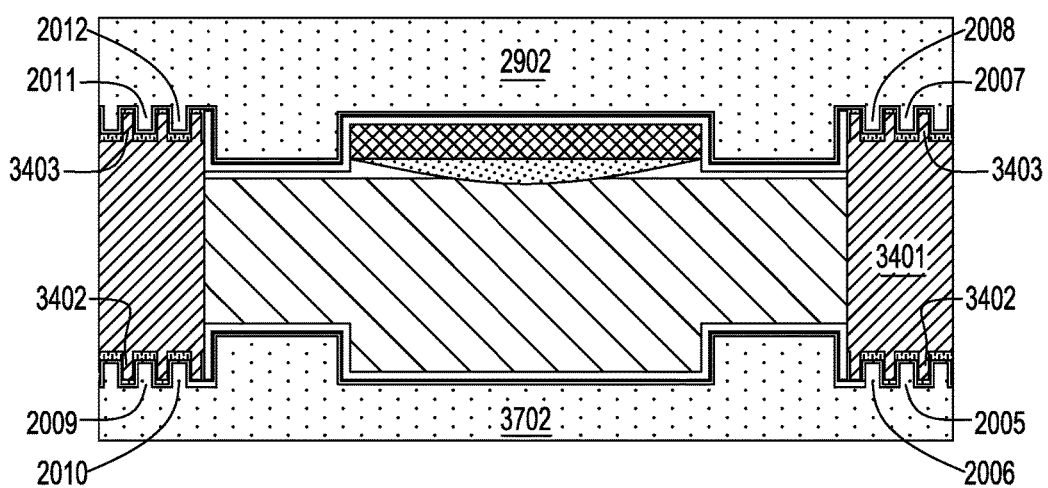
FIG. 20 is a schematic sectional illustration showing minor grooves etched in cavities of the anode side and the cathode side of a microbattery in accordance with an embodiment of the present invention. An insulated centerpiece has protruding structures whose shapes are complementary to the grooves on cavities in the anode side and the cathode side in accordance with an embodiment of the present invention.

FIG. 20 depicts a microbattery structure in which cavities on the cathode side 3702 comprise grooves 2005, 2006 and 2009, 2010 etched in them, respectively. In an embodiment, cavities on anode side 2902 comprise grooves 2007, 2008 and 2011, 2012 etched in them, respectively. In an embodiment, insulated centerpiece 3401 comprises protruding structures 3402, 3403 whose shapes are complementary to grooves 2005, 2006 and 2007, 2008 thereby forming an interlock structure when bonded with anode side 2902 and cathode side 3702. In an embodiment, insulated centerpiece 3401 comprises protruding structures 3402, 3403 whose shapes are complementary to grooves 2009, 2010 and 2011, 2012 thereby forming an interlock structure when bonded with anode side 2902 and cathode side 3702.

In an embodiment, grooves 2005, 2006, 2007, 2008, 2009, 2010, 2011 and 2012 are etched using D-RIE. In an embodiment, grooves 2005, 2006, 2007, 2008, 2009, 2010, 2011 and 2012 are etched in any arbitrary shape. In an embodiment, protruding structures 3402 and 3403, have shapes complementary to grooves 2005, 2006, 2007, 2008, 2009, 2010, 2011 and 2012.

Figure 21:
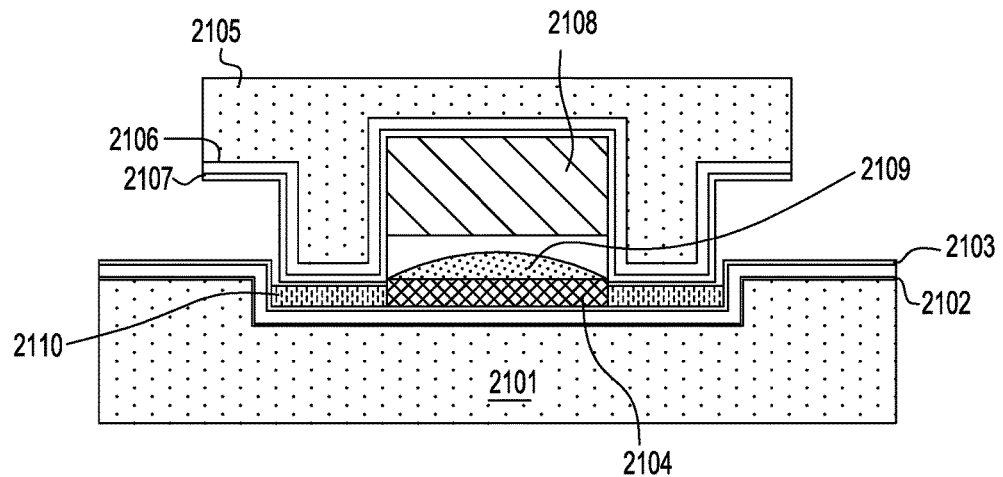
FIG. 21 is a schematic sectional illustration of an interlock structure of a microbattery comprising a shallow anode and deep cathode insert bonded in a mortice and tenon fashion in accordance with one embodiment of the present invention.

FIG. 21 depicts a microbattery structure in which shallow anode 2101 is bonded to a deep cathode 2105 in a mortise and tenon fashion to form an interlock structure. In an embodiment, anode side 2101 comprises adhesion layer 2102 and current collectors 2103 followed anode material 2104, sealant material 2110 and electrolyte-infused separator material 2109. In an embodiment, cathode side 2105 comprises adhesion layer 2106, current collector 2107 and cathode material 2108.

Figure 22:
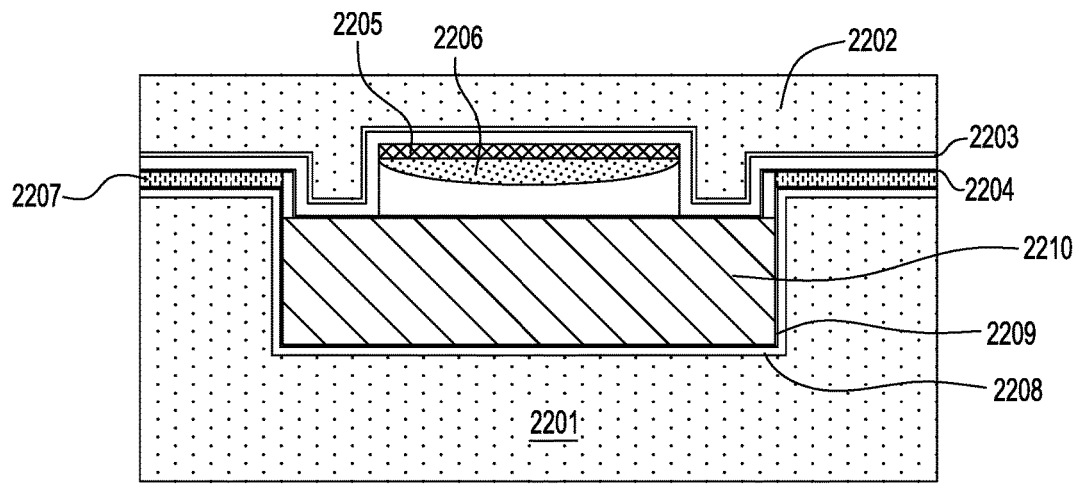
FIG. 22 is a schematic sectional illustration of an interlock structure of a microbattery comprising a deep cathode and shallow anode insert bonded in a mortise and tenon fashion in accordance with one embodiment of the present invention.

FIG. 22 depicts a microbattery structure in which shallow anode 2202 is aligned and superimposed over deep cathode 2201 and bonded together to form an interlock structure in a mortise and tenon fashion. In an embodiment, anode side 2202 comprises adhesion layer 2203, current collectors 2204, anode material 2205, electrolyte separator 2206 and sealant material 2207. It is highly advantageous to coat the sealant material on anode side. In an embodiment, cathode side 2201 comprises adhesion layer 2208, current collector 2209 and cathode material 2210. Current collectors 2209 and 2204 are left discontinuous to avoid shorting of the battery.

While the present invention has been particularly shown and described with respect to various embodiments thereof, it will be understood by those skilled in the art that the foregoing and other changes in forms and details may be made without departing from the spirit and scope of the present invention. It is therefore intended that the present disclosure not be limited to the exact forms and details described and illustrated, but fall within the scope of the appended claims.

The invention claimed is:

1. A microbattery structure for forming hermetically sealed microbatteries, comprising:
a first silicon substrate containing at least one pedestal which defines an area that houses a cathode material and at least one depression which defines an area that houses a first sealant material;
a second silicon substrate containing at least one pedestal which defines an area that houses an anode material and at least one depression which defines an area that houses a second sealant material; and
an insulated centerpiece bonded to said first sealant material present in said at least one depression on said first silicon substrate, wherein an interlock structure is formed by aligning and superimposing said second silicon substrate on said first silicon substrate in a mortise and tenon fashion.

2. The microbattery structure of claim 1, further comprising an anode and cathode current collectors escape package present between an insert and said insulated centerpiece to avoid shorting of said microbattery structure.

3. The microbattery structure of claim 1, wherein a seal is provided having a seal width of no greater than 100 µm.

4. The microbattery structure of claim 3, wherein said seal has an aspect ratio of greater than 10:1.

5. The microbattery structure of claim 1, wherein both of said first and second sealant materials have selective permeability to gaseous substances, allowing passage of hydrogen molecules only.

6. The microbattery structure of claim 1, wherein said microbattery structure has a width of no greater than 400 µm.

7. The microbattery structure of claim 1, wherein said at least one depression on said first silicon substrate is textured.

8. The microbattery structure of claim 1, wherein grooves are present on surfaces of said insulated centerpiece and said grooves are located in protruding structures present on said depressions of said first and second silicon substrates.

9. The microbattery structure of claim 1, wherein said insulated centerpiece interlock has grooves that interlock with protruding structures on said depressions of said first and second silicon substrates in a mortise and tenon fashion.

10. A microbattery structure for forming hermetically sealed microbatteries, comprising
a first silicon substrate containing at least one depression which houses a sealant material and an anode material, wherein said sealant material laterally surrounds and directly contacts a sidewall of said anode material; and
a second silicon substrate containing at least one pedestal which houses a cathode material and at least one depression, wherein an interlock structure is formed by aligning and superimposing said second silicon substrate on first silicon substrate in a mortise and tenon fashion.

11. The microbattery structure of claim 10, wherein a seal width is no greater than 100 µm.

12. The microbattery structure of claim 11, wherein said seal has an aspect ratio of greater than 10:1.

13. The microbattery structure of claim 12, wherein thickness of microbattery structure is no greater than 400 µm.

14. The microbattery structure of claim 10, wherein said sealant material has selective permeability to gaseous substances, allowing passage of hydrogen molecules only.

15. A microbattery structure for forming hermetically sealed microbatteries, comprising:
a first silicon substrate containing at least one pedestal which defines an area that houses a cathode material; and
a second silicon substrate containing at least one pedestal which defines an area that houses an anode material and at least one depression which defines an area that houses a sealant material, wherein an interlock structure is formed by aligning and superimposing said second silicon substrate on first silicon substrate in a mortise and tenon fashion and wherein said cathode material is located entirely within said area defined by the at least one pedestal present in said first silicon substrate.

* * * * *